C. A. HOFFMAN.
EYEGLASSES.
APPLICATION FILED MAR. 16, 1916.
1,243,410.
Patented Oct. 16, 1917.
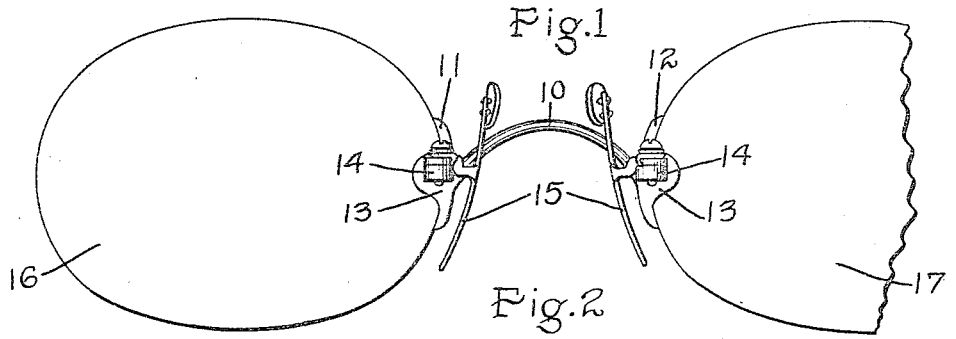
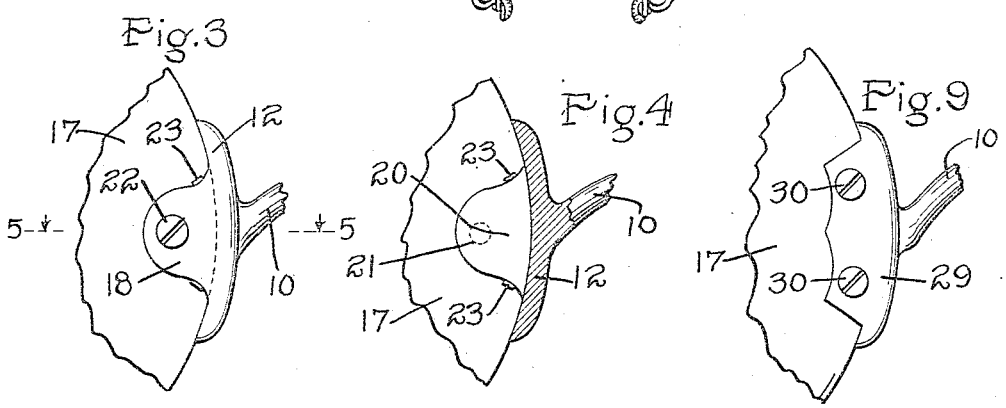
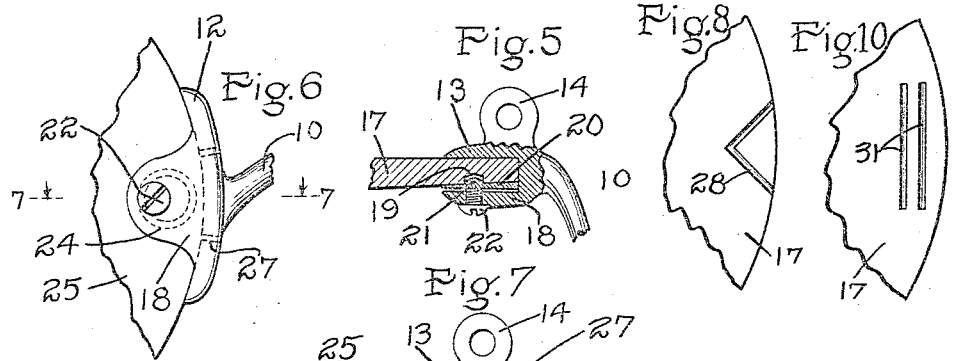
Witnesses:
Alex. Gagaard.
H. A. Bowman.
Inventor:
Charles A. Hoffman
By R. A. Whitley
his Attorney.

UNITED STATES PATENT OFFICE.

CHARLES A. HOFFMAN, OF MINNEAPOLIS, MINNESOTA.

EYEGLASSES.

1,243,410.               Specification of Letters Patent.        Patented Oct. 16, 1917.

Application filed March 16, 1916. Serial No. 84,536.

*To all whom it may concern:*

Be it known that I, CHARLES A. HOFFMAN, a citizen of the United States, residing at Minneapolis, in the county of Hennepin and State of Minnesota, have invented certain new and useful Improvements in Eyeglasses, of which the following is a specification.

My invention relates to eye-glasses and has for its object to provide a rigid and effective mounting for securing the lens within the lens strap, which mounting permits the hinge joint for the nose guard to be placed directly on the lens strap. In carrying out my objects I provide a soft metal washer or plate having projections fitting into corresponding depressions on the edge of the lens, which plate is cemented thereto. The lens and this plate are clamped in between the members of the lens strap and held in place by a set-screw in one of said members acting against said soft metal plate.

The full objects and advantages of my invention will appear in connection with the detailed description thereof and are particularly pointed out in the claims.

In the drawings, illustrating the application of my invention in one form,—

Figure 1 is a rear view of a pair of my improved eye-glasses drawn to a large scale. Fig. 2 is a plan edge view of the same. Fig. 3 is an enlarged front view of a portion of a lens and its mounting showing my invention in one form. Fig. 4 is a view similar to Fig. 3 with a portion of the lens strap removed. Fig. 5 is a sectional view taken on line 5—5 of Fig. 3. Fig. 6 is a view similar to Fig. 3 of a modified form of my invention. Fig. 7 is a sectional view taken on line 7—7 of Fig. 6. Fig. 8 is a front view of a portion of a lens showing another method of grooving the same. Fig. 9 is a view similar to Fig. 3 of still another form of the invention. Fig. 10 is a front view of a portion of the lens used with the mounting indicated in Fig. 9 showing the manner of grooving the same.

In mounting lenses of eye-glasses it is the usual practice to drill holes through the lens and secure the same to the lens strap by means of a screw which passes directly through said hole. Such holes weaken the lens and often cause the lens to break while drilling as well as after the lens has been mounted, due to unequal expansion and contraction of the glass and metals and due to improper alinement of the holes in the lenses and the screws. In my invention I secure the lens in place by a set-screw which acts against the lens on one side and so prevents this disadvantage.

As best shown in Figs. 1 and 2, my invention comprises a nose bridge 10 terminating in a pair of lens straps 11 and 12. From rear members 13 of said lens straps issue lugs or ears 14 on which are pivoted nose guards 15 in the usual manner. Lenses 16 and 17 are mounted on the lens straps 11 and 12 and held in place from the opposite members 18 of said straps in a manner to be presently described. With this construction the distance between the lens strap is shortened, thus allowing larger lenses to be used and increasing the angle of vision.

The preferred form of lens mounting is clearly shown in Figs. 3, 4 and 5. The members 13 and 18 of strap 11 project out from this strap parallel to each other and are curved on the outer surfaces to present a substantially smooth surface to the lens when it is in place. Lens 16, as noted in Figs. 1 and 5, is shown as convex and is provided with a cavity or depression 19 extending a short distance into the surface thereof. A washer or plate 20 formed of some soft metal is provided with a projection 21 which fits into the cavity 19 in lens 16. This washer is so shaped that the outer surface of it and the rear surface of the lens are parallel. In mounting the lens this washer is cemented in place upon the lens and the lens and washer inserted in between the members 13 and 18 of the lens strap. A set-screw 22 screws into member 18 against the plate 20 and firmly clamps the lens in place, the lug 21 and cavity 19 preventing the plate from slipping off from the lens. A pair of lugs 23 project up from the plate 20 along the sides of the member 18 and prevent said plate from moving when the screw 22 is brought to bear upon it. It will be noted that the size and shape of plate 20 conforms to that of member 18 so that it is not visible from the exterior. Both the lens and plate may be cemented into the lens strap and a rather plastic cement may be used requiring less heat and time to set. With this construction the line of breakage of the lens is shifted from the locality of the cavity or hole to the outer edge of the plate or lens strap so that the strength of the lens at the mounting is greatly increased. If desired, a similar plate may be secured to the other side of the lens to make the mounting doubly secure. This, however, is not found to be necessary and also weakens the lenses somewhat.

The shape of the cavity in which the soft metal plate is partly embedded may be of any desired shape. An annular groove 24, as shown in Figs. 6 and 7, may be employed with the same form of lens strap to take the place of cavity 19. A concave lens 25 is here shown, the plate 26 being beveled in the opposite direction to plate 20 to give the same effect. Lugs 27 on plate 26 extending out in the plane thereof may pass through corresponding holes in the back of the lens strap to serve the same purpose as lugs 23 in the preferred form of my invention. Fig. 8 shows still another manner of grooving the lenses. A V-shaped groove 28 is easily cut in the lens by means had at hand by all opticians and serves the same purpose as either the annular or cylindrical cavity.

This mode of mounting lenses may be equally well used with the ordinary form of lens strap employed in which a screw passes through both of the members thereof. The screw is merely cut off and used as a set-screw, as in either of the examples set forth. One such form is shown in Fig. 9 in which a strap 29 is used having two screws 30. With this type it becomes necessary, however, to form the grooves on the lens and conform to the shape of the lens strap. A pair of parallel grooves 31, as shown in Fig. 10, would serve this purpose.

The advantages of my invention are manifest. Any thickness of lens may be properly mounted to completely fill the space in the lens strap by using a plate of excess thickness which can be easily filed to fit, or said lens can be mounted with any size plate by use of a proper length of screw. The plates can be used with stock lenses which have holes drilled completely through them, said holes taking the place of the cavities or grooves mentioned.

I claim:

1. In combination with the lens and lens strap of an eye-glass, a plate on one side of said lens, means securing the plate and lens together, and clamping means coöperating with said lens strap and engaging said plate for holding the lens in place upon said lens strap members.

2. In combination with the lens and lens strap of an eye-glass, a plate between said lens and one of the members of said lens strap, means for clamping said plate against the lens to hold said lens in place between said lens strap members, and means for preventing the plate from slipping on the lens.

3. The combination with the lens and lens strap of an eye glass, of a plate interposed between the lens and one of the members of the strap, said plate and lens having interlocking engagement, and means for clamping the plate against the lens to hold said lens in place between the lens strap members.

4. The combination with the lens and lens strap of an eye glass, of a plate interposed between the lens and one of the members of the lens strap, said plate having an interlocking engagement with the strap, and means for clamping the plate against the lens to hold said lens in place between the lens strap members.

5. The combination with the lens and lens strap of an eye glass, of a plate interposed between the lens and one of the members, said plate having an interlocking engagement with the lens and an interlocking engagement with the lens strap, and means for clamping the plate against the lens to hold said lens in place between the lens strap members.

6. In combination with the lens and lens strap of an eye-glass, a plate between said lens and one of said lens strap members, said lens having an indentation, a projection on said plate fitting into said indentation for preventing the plate from slipping on the lens, and means for clamping said plate against the lens to hold said lens in place between said lens strap members.

7. In combination with the lens and lens strap of an eye-glass, a plate between said lens and one of said lens strap members, said lens having a groove in the surface thereof, a ridge on said plate fitting into said groove for preventing the plate from slipping on the lens, and means for clamping said plate against the lens to hold said lens in place between said lens strap members.

8. In combination with the lens and lens strap of an eye-glass, a plate between said lens and one of the members of said lens strap, means for clamping said plate against the lens and holding the lens in place between said lens strap members, and a pair of lugs on said plate passing through said lens strap for holding the plate in position relative to the lens strap.

9. In combination with the lens and lens strap of an eye-glass, a plate between said lens and one of the members of said lens strap, means for clamping said plate against the lens and holding the lens in place between the lens strap members, and a pair of lugs formed on the edge of said plate extending outward in the plane thereof and passing through said lens strap member for holding the plate in position relative to the lens strap member.

10. In combination with a lens having its sides angularly disposed, a lens strap formed with parallel members for receiving the lens, a plate between said lens and one of said lens strap members having a tapered portion and being so positioned as to substantially fill up the space between the lens and lens strap member, and means to clamp said plate and lens in place.

11. The combination with a lens strap having lens embracing members, of a lens located between said members, the portion between the members being imperforate, a plate interposed between the lens and one of the members, means for preventing relative sliding movement between the plate and lens, and means for clamping the lens against the plate to secure the lens between the members.

In testimony whereof I affix my signature in presence of two witnesses.

CHARLES A. HOFFMAN.

Witnesses:
H. A. BOWMAN,
ALEX LAGAARD.

Copies of this patent may be obtained for five cents each, by addressing the "Commissioner of Patents, Washington, D. C."